United States Patent
Schwarzkopf

(10) Patent No.: US 7,521,885 B2
(45) Date of Patent: Apr. 21, 2009

(54) ACTIVATION OF AN ELECTRIC MOTOR WITH CONTINUOUS ADJUSTMENT OF THE COMMUTATION ANGLE

(75) Inventor: Johannes Schwarzkopf, Marktheidenfeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 448 days.

(21) Appl. No.: 10/595,813
(22) PCT Filed: Aug. 11, 2004
(86) PCT No.: PCT/EP2004/051766

§ 371 (c)(1),
(2), (4) Date: May 12, 2006

(87) PCT Pub. No.: WO2005/048444

PCT Pub. Date: May 26, 2005

(65) Prior Publication Data

US 2007/0114961 A1  May 24, 2007

(30) Foreign Application Priority Data

Nov. 12, 2003  (DE) .............................. 103 52 749

(51) Int. Cl.
*H02P 23/12* (2006.01)
(52) U.S. Cl. .......................... 318/400.14; 318/400.38; 318/700; 318/712
(58) Field of Classification Search ................. 318/700, 318/400.14, 400.38, 712, 719–721
See application file for complete search history.

(56) References Cited

U.S. PATENT DOCUMENTS

| | | | |
|---|---|---|---|
| 4,864,198 A * | 9/1989 | Takase et al. .......... 318/400.01 |
| 5,677,605 A | 10/1997 | Cambier et al. ............. 318/254 |
| 6,049,149 A * | 4/2000 | Lin et al. .................. 310/68 R |
| 6,362,582 B1 | 3/2002 | Bernauer et al. ............ 318/254 |
| 6,570,353 B2 * | 5/2003 | Krotsch et al. ......... 318/400.24 |
| 6,838,841 B2 | 1/2005 | Kessler ....................... 318/254 |
| 6,891,346 B2 * | 5/2005 | Simmons et al. ....... 318/400.04 |
| 7,259,531 B1 * | 8/2007 | Liu ........................ 318/400.38 |
| 2004/0056613 A1 * | 3/2004 | Horng et al. ................ 318/254 |

FOREIGN PATENT DOCUMENTS

| | | |
|---|---|---|
| DE | 4425193 C1 | 11/1995 |
| DE | 19725521 A1 | 12/1998 |
| DE | 10023370 A1 | 11/2001 |
| DE | 10115873 A1 | 10/2002 |
| GB | 2388090 A | 11/2003 |

OTHER PUBLICATIONS

International Search Report and Written Opinion for International Application No. PCT/EP2004/051766 (7 pages).
PCT Search Report, PCT/EP2004/051766, 4 pages.

* cited by examiner

*Primary Examiner*—Bentsu Ro
*Assistant Examiner*—Thai Dinh
(74) *Attorney, Agent, or Firm*—Baker Botts L.L.P.

(57) ABSTRACT

In a method for improving commutation of the at least one phase (Pi) of an electric motor (1), the commutation angle (alpha) of the one or more phases (Pi) is continuously varied in accordance with the rotary frequency (f) of the electromagnetic energizing field (F) of the electric motor (1) and/or in accordance with an adjustable variable (S) which is characteristic of the driving power. A device (9) suitable for carrying out the method has a frequency converter 5) and a control unit (6) controlling the same and adapted to carry out the method.

11 Claims, 5 Drawing Sheets

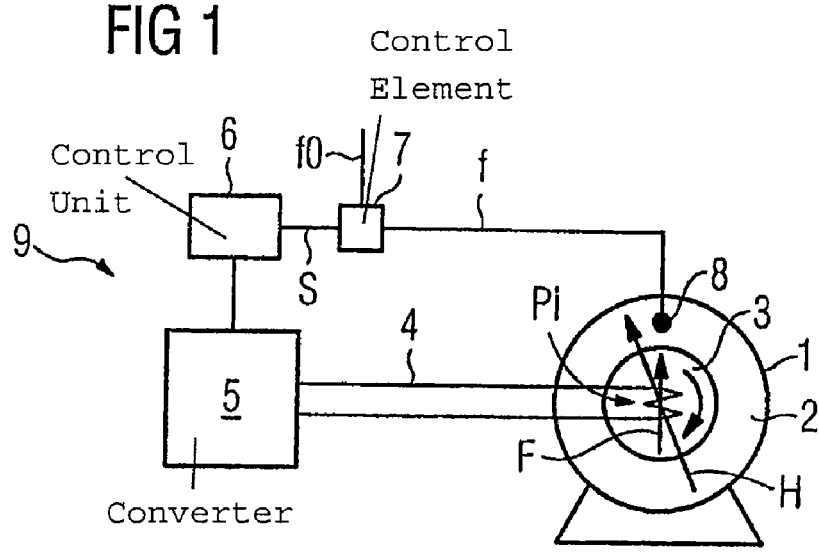
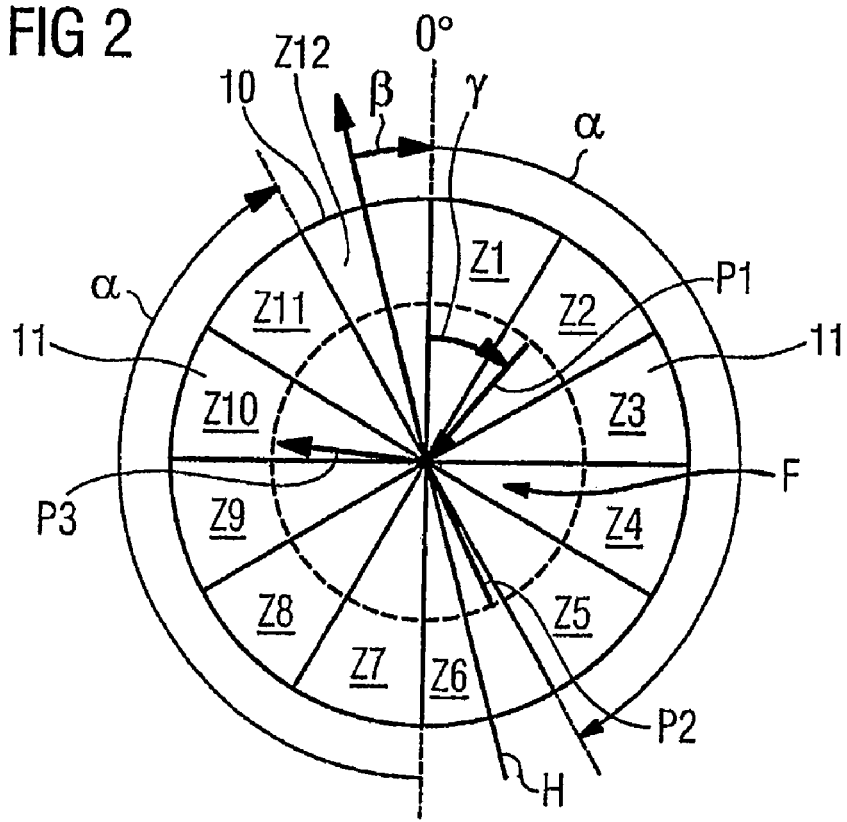

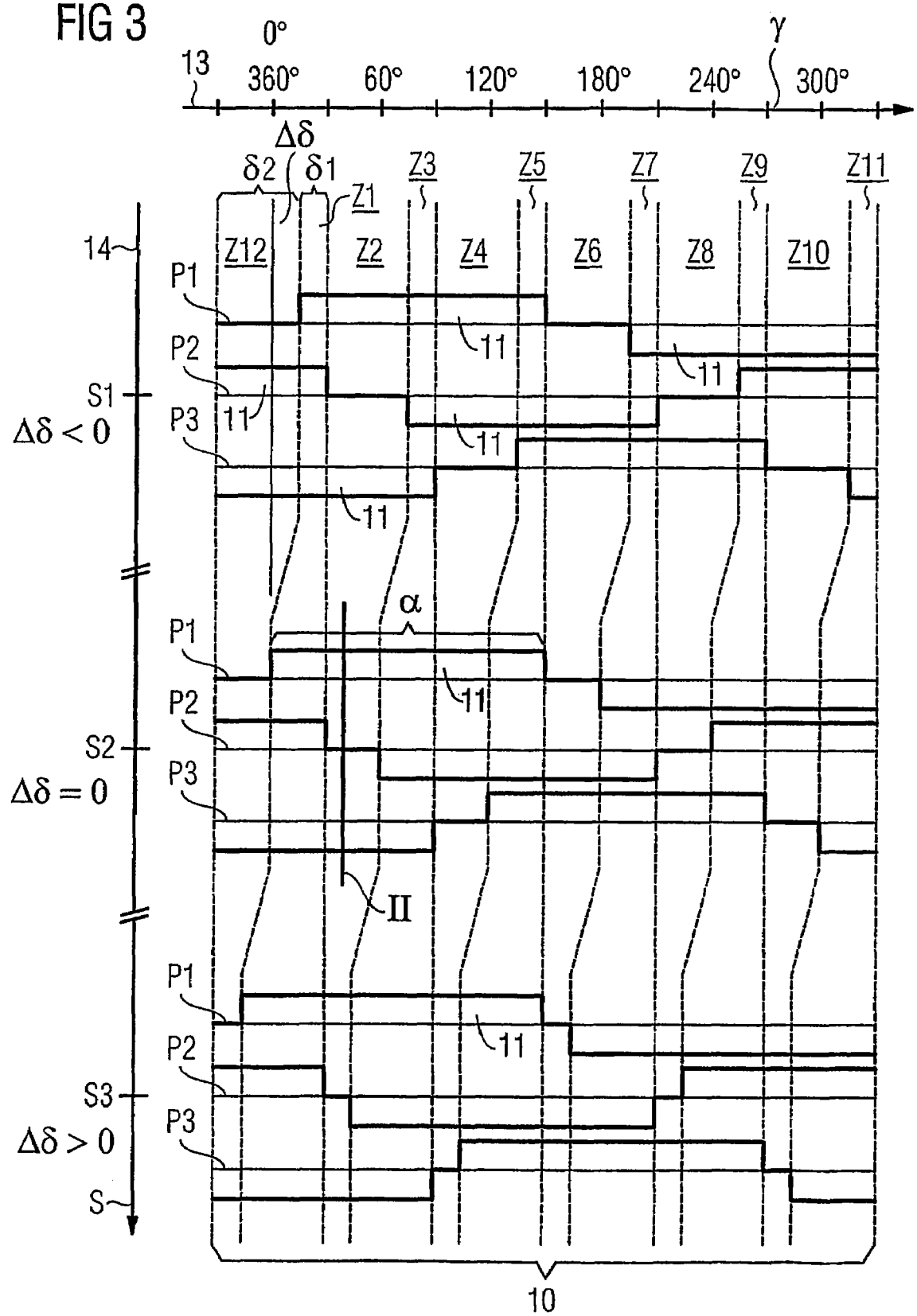

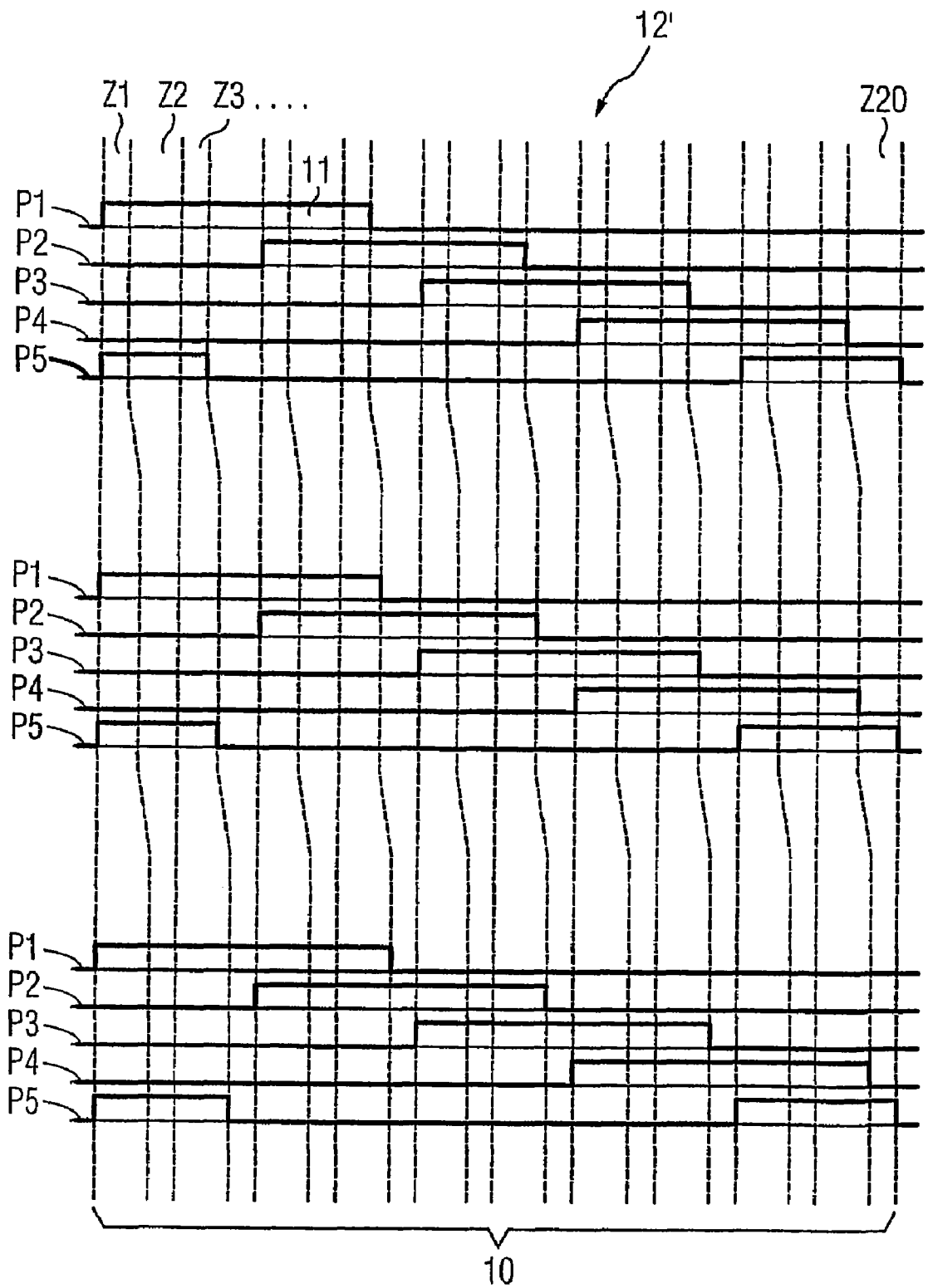

ACTIVATION OF AN ELECTRIC MOTOR WITH CONTINUOUS ADJUSTMENT OF THE COMMUTATION ANGLE

CROSS-REFERENCE TO RELATED APPLICATIONS

This application is a U.S. national stage application of International Application No. PCT/EP2004/051766 filed Aug. 11, 2004, which designates the United States of America, and claims priority to German application number DE 103 52 749.4 filed Nov. 12, 2003, the contents of which are hereby incorporated by reference in their entirety.

TECHNICAL FIELD

The invention relates to a method and to a device for commutating the at least one phase of an electric motor.

BACKGROUND

A converter (or commutator) is conventionally used for polarity reversal of a phase of the electromagnetic energizing field of an electric motor in the area of the zero crossing point. The zero crossing point is taken to be the position of the phase in which the phase is aligned in parallel to the stator field of the motor, so that no torque is exerted on the rotor of the motor.

With a modern electric motor, especially as used in drive systems of electric vehicles, commutation is mostly undertaken using power transistors.

For the commutation of such an electronically commutatated motor a full electrical cycle, i.e. a full rotation of the energizing field by 360° is subdivided into similar shaped zones (or "states"). At the beginning of each zone the power transistors can be switched on or off for commutating a phase. The state of the phase is then retained until at least the end of the zone, but can optionally be overlaid by a pulse width modulated (PWM) signal.

The division of the full cycle into zones defines a discrete number of possible commutation angles of the phase or of each phase. In this case that part of the full cycle during which the phase or each phase is activated, i.e. energized, is designated as the commutation angle. For a division of the full cycle into twelve equal zones, the commutation angle can for example be 180°, 150°, 120°, . . . . Previously an electric motor has frequently been operated with a fixed commutation angle.

SUMMARY

The object of the invention is to specify a method for commutation of an electric motor through which a good drive result will be achieved for each operating point of the motor. A good drive result is expressed especially in a low and even current consumption of the motor at a comparatively high torque which remains stable over time, a low load on the motor and/or on the converter, a good utilization of the power of the motor, a good electromagnetic compatibility etc. The object of the invention is furthermore to specify a particularly suitable device for executing said method.

In accordance with the invention there is provision for continuously varying the commutation angle of the phase or of each phase of the electric motor depending on the rotary frequency of the energizing field and/or on an adjustable variable characteristic for the drive power.

The invention is based on the idea that varying the commutation angle with the speed of the motor or the motor power is advantageous. Thus operation of the motor at a comparatively high commutation angle in the high speed or power range leads to good utilization of the performance of the motor, a low current ripple and a comparatively low power dissipation. On the other hand, in the low speed or power range the operation of the motor at a comparatively small commutation angle has the advantage that the transistors and capacitors of the converter are subject to a comparatively low load, especially since in this way the use of PWM is not necessary or is only necessary to a small degree. A further idea underlying the invention is that a discrete, i.e. staged change of the commutation angle would result in an unsteadiness of the operating behavior of the motor. Such unsteadiness could obviously be disadvantageous in the operation of the motor. In particular the motor would be expected to jump backwards and forwards between two operating points in a transition area. This would cause heavy fluctuation to occur in power consumption and in torque, which would cause a comparatively high load to be imposed on the motor as a result of the constant speeding up and slowing down.

The fact that the commutation angle in accordance with the invention is continuously varied enables the commutation of the motor to be adapted especially well to each operating point of the motor in a simple manner, without such an unsteadiness occurring.

In an especially easy to implement embodiment of the invention the full cycle of the energizing field is subdivided into a number of zones, with the phase or each phase of the motor being commutatated accordingly depending on control patterns stored in these zones. In this case by varying the extent of the angle of at least two zones, the continuous variation of the commutation angle is made possible.

Preferably these zones are subdivided into two groups with zones of the same group always featuring the same angular extent. In this case the zones of the different groups are arranged alternating to each other so that a zone of the first angular extent always follows a zone of the second angular extent and vice versa. During the course of setting the commutation angular the zones of the first group can in this case be shortened or lengthened in favor of the zones of the second group as regards their angular extent. The phase or each phase is usefully activated (or energized) via an odd number of consecutive zones. The commutation angle is consequently defined by the sum of the angular extents of 1,3,5, . . . consecutive zones and thus varies with the ratio of the size of the zones of the two groups.

Preferably the commutation angle is adjusted with regard to the power range of the motor such that the commutation angle for a low torque or for a low power of the motor is at its minimum and for a high torque or a high power is at its maximum.

To adjust the commutation angle in line with requirements it is especially advantageous not just to include the pure rotary frequency as a control variable for the commutation angle but also an adjustable variable which, like the accelerator pedal setting of an automobile, is characteristic for the engine power. This adjustable variable is usefully derived from the (actual) rotary frequency and an associated required variable, especially using a PI (Proportional/Integral) regulator.

The operating behavior of the motor is preferably further improved by pulse width modulation of the phase. This means that the phase or each phase within the commutation angle is not activated constantly but pulsed. The width i.e. the angular extent of this individual pulse is modulated, i.e. varied in its turn depending on the rotary frequency or the adjustable variable.

It has proved to be especially advantageous preferably to employ individual parameters of those described here for controlling the operating behavior of the electric motor, i.e. the commutation angle and also the pulse width modulation in a specific speed or power range of the motor. In this sense pulse width modulation is used in the low-power range of the motor while the commutation angle is kept constant. In a high power range of the motor in this embodiment of the inventive method the commutation angle is then varied between its minimum value and its maximum value, whereas the pulse width ratio is kept constant. The pulse width ratio amounts here especially to 100%, i.e. the phase or each phase is subject to constant activation during the commutation angle.

The method described here is optionally provided for a unipolar activation as well as for a bipolar activation of the phase or of each phase.

A device features a converter which activates the at least one phase of an electric motor. The converter for its part is activated by a control unit, with this unit being embodied to execute the method described here.

The converter is preferably an electronic converter equipped with power semiconductor components for switching the phase or each phase. The control unit is in this case embodied especially as a microcontroller equipped with the corresponding software modules. Also conceivable would be an application of the inventive method to a mechanical converter. The division into zones in accordance with the method could be implemented here by a suitable, e.g. trapezoidal, design of the current collector surfaces. A continuous change of the commutation angle could in this case be achieved by a suitable control unit through power-dependent axial displacement of the converter in respect of the corresponding friction contacts.

The control unit is preferably fed by a sensor with the (time-dependent) orientation of the energizing field and/or of its rotary frequency as an input variable.

BRIEF DESCRIPTION OF THE DRAWINGS

Exemplary embodiments of the invention are explained in more detail below on the basis of a drawing. The Figures show:

FIG. 1 a schematic diagram of an electric motor with an upstream converter and a control unit for activating the converter, FIG. 2 a schematic diagram of an orientation of the electromagnetic energizing field for a three-phase bipolar activated embodiment of the electric motor in accordance with FIG. 1 within a full cycle, FIG. 3 a schematic diagram of a control pattern for the electric motor in an embodiment in accordance with FIG. 2

FIG. 4 in a diagram in accordance with FIG. 3, a control pattern for a five-phase unipolar activated embodiment of the electric motor, FIG. 5 a control element for deriving an adjustable variable fed to the control unit as an input variable on the basis of the (actual) speed and an associated required variable, FIG. 6 in a schematic flowchart a method for commutating the electric motor in accordance with FIG. 1 and FIG. 7 a diagram of the parameter settings depending on the adjustable variable made in the course of the method shown in FIG. 6.

Parts and variables which correspond to each other are always shown by the same reference symbols in all the Figures.

DETAILED DESCRIPTION

Figure 5:
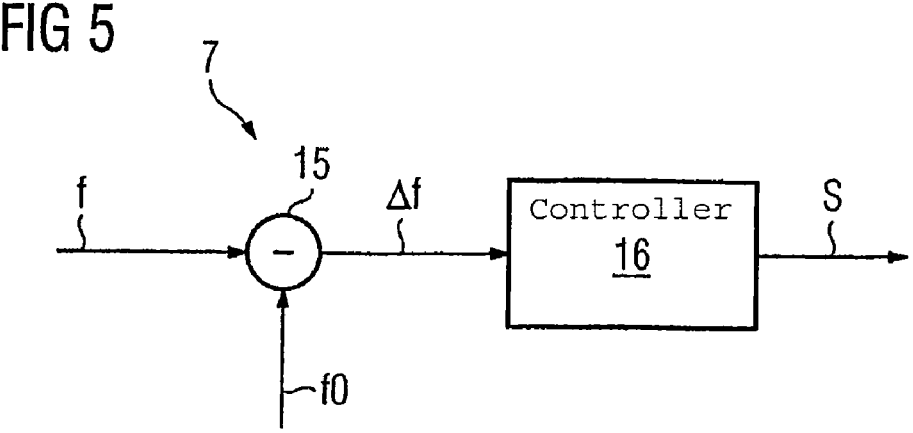

The scheme outlined in simplified form in FIG. 1 shows an electric motor 1 with a rotor 3 rotating within a stator 2. The rotor 3 carries an energizer circuit 4 for generation of an electromagnetic energizing field Fl, which rotates with the rotor and thereby against a fixed electromagnetic stator field H.

As is not explicitly shown in the simplified scheme in accordance with FIG. 1, the electric motor 1 as a rule features a number of energizing circuits 4. The energizing circuit 4 thus produces only one component of the entire energizing field F. An energizing circuit 4 as well as the components of the energizing field F generated by this circuit are referred to jointly as phase Pi (i=1,2,3, ... ).

The energizing circuit 4 of each phase Pi is connected to a converter 5 by means of which a current flow creating a field can be induced in the energizing circuit 4. This is referred to as the activation or energizing of the relevant phase Pi. In this case a distinction is made between unipolar and bipolar activation. With unipolar activation the current flow is binary, i.e. it can be switched on and off between the "0" status and a "1" status. With bipolar activation the current flow in the energizing circuit 4 can have its polarity reversed so that the relevant phase Pi is controllable between the status values −1, 0 and +1. With polarity reversal of the current flow in the energizing circuit 4 of the phase Pi the orientation of the associated field components of the energizing field F is also inverted.

The phases Pi are connected within the converter 5 by means of power transistors (not shown in greater detail). The converter 5, and especially its power transistors, are activated by a control unit 6 embodied as a microcontroller. The control unit 6 is connected on the input side via a control element 7 to a sensor 8 arranged in the electric motor 1, especially a Hall sensor.

The sensor 8 picks up a measurement variable characteristic for the time-dependent orientation of the energizing field F and thereby of its rotary frequency f and feeds this value to the control element 7. A required variable f0 for the rotary frequency is also fed to the control element 7. On the basis of the (actual) rotary frequency f and the associated required variable f0 the control element determines in a manner described in greater detail below an adjustable variable S and feeds this to the control unit 6.

The converter 5 and the control unit 6 together with the control element 7 and the sensor 8 form a device 9 for commutating the phase or each phase Pi of the electric motor 1.

The scheme depicted in FIG. 2 shows an orientation, i.e. a "snapshot", of the energizing field F within a full cycle 10. A rotation of the energizing field F by a full circle of 360° is referred to as a full cycle. In the diagram shown in FIG. 2 the electric motor 1 is embodied as a three-phase motor for bipolar activation. The energizing field F thus includes the three phases P1, P2 and P3. The direction of the arrow in this case indicates the polarity of the relevant field component. Thus the phase P1 is activated positively ("1" status), i.e. with connected to the positive supply voltage. The phase P3 is activated negatively ("−1"-status), i.e. connected to the negative supply voltage or GND. The phase P2 is not activated ("0"status), as is shown by the missing tip to the arrow.

The full cycle 10 is subdivided into twelve zones Zi (i=1, 2, ... ,12). The direction of the stator field H runs in the diagram through the zones Z6 and Z12. The division of the full cycle 10 into zones Zi is used for simplified activation of the current ender 5, in that the status of a phase Pi can always be changed if the phase crosses the border line between the two zones Zi. In accordance with FIG. 2 each phase Pi is activated positively on passing from zone Z0 to Z1 (0->1) and on passing from zone Z5 to zone Z6 is deactivated again (1->0). On passing from zone Z6 to zone Z7 phase Pi is activated negatively (0->−1) and on passing from zone Z11 to Z1 is deactivated again (−1->0).

The angle between activation and deactivation of a phase Pi is referred to as the commutation angle $\alpha$. The zones Zi enclosed within the commutation angle $\alpha$ together form a commutation area 11. In the division of the full cycle 10 into twelve equal zones Zi shown by way of an example in FIG. 2, each with an angular extent of 30°, and commutation areas 11, the fifth zone Zi in each case amounts to the commutation angle $\alpha=150°$.

The angle between the orientation of the stator field H (and thereby the zero crossing point of a phase Pi) and the beginning of the commutation area 11 is designated as the ignition angle $\beta$. In the example shown in FIG. 2 the ignition angle $\beta$ is 15°.

To enable the commutation angle $\alpha$ to be adjusted continuously the angular extent of the zones Zi is variable. The zones Zi are in this case divided up alternately into a first group comprising the odd-number zones Zl (l=1,3,5, . . . ,11) and a second group comprising the even-number zones Zm (m=2, 4,6, . . . ,12). The zones Zl of the first group in this case contain an angular extent of $$\delta 1 = \frac{360°}{n} + \Delta\delta. \qquad \text{EQN 1}$$

The zones Zm correspondingly receive an angular extent of $$\delta 2 = \frac{360°}{n} + \Delta\delta. \qquad \text{EQN 2}$$

In this case n identifies the total number of the zones Zi, thus in the example shown in FIG. 2 n=12. The following equation then applies for the difference angle $\Delta\delta$ $$-\frac{360°}{n} \leq \Delta\delta \leq \frac{360°}{n}. \qquad \text{EQN 3}$$

FIG. 3 shows a schematic diagram of a control pattern 12, as stored for the activation of the converter 5 in the control unit 6. The control pattern 12 in accordance with FIG. 3 is designed for a three-phase, bipolar electric motor 1, corresponding to the scheme shown in FIG. 2. The control pattern 12 is presented in the form of a two-dimensional diagram, on the horizontal axis 13 of which the orientation angle $\gamma$ of the phase P1 within the full cycle 10 (cf. FIG. 2) is plotted. The adjustable variable S is plotted continuously along the vertical axis 14. The stored control pattern 12 is also defined within a predetermined interval for each given value of the adjustable variable S. To present the information more clearly the control pattern 12 in FIG. 3 is only shown for three typical selected discrete values S1, S2 and S3 of the adjustable variable S.

In the diagram of the control pattern 12 in accordance with FIG. 3 the zones Zi are expressed as surfaces arranged next to one another in a horizontal direction, delimited from each other by dashed lines. In compliance with the orientation angle $\gamma$ plotted on the horizontal axis 13 the zone labeling shown in FIG. 3 also relates to the orientation of the phase P1 as reference phase. To this end the position of the phase P2 is always offset by four zones, the position of the phase P3 is always offset by eight zones. The status of each phase Pi for a given value S1, S2, S3 of the adjustable variable S is shown FIG. 3 is in the form of a stepped function with the values −1, 0, 1 depending on the angle of orientation $\gamma$.

It can be seen from FIG. 3 that, depending on the adjustable variable S, the size ratio $\delta 1/\delta 2$ of adjacent zones Zi and Z(i±1) is varied. So for S=S1 the difference angle $\Delta\delta$ is negative, so that $\delta 1 < \delta 2$. Conversely for S=S3 the difference angle Ad is positive, so that $\delta 1 > \delta 2$. For S=S2 the special case shown in FIG. 2 is obtained in which the difference angle $\Delta\delta$ disappears and accordingly all zones Zi have the same angular extent $\delta 1 = \delta 2$. The instantaneous orientation of the phases P1, P2 and P3 shown in FIG. 2 is indicated in FIG. 3 by a perpendicular lines labeled II.

By comparing corresponding commutation ranges 11 for different values S1, S2, S3 of the adjustable variable S it becomes evident that the commutation angle $\alpha$ (corresponding to the length of the commutation area 11) is continuously varied as a result of the change to the difference angle $\Delta\delta$. As can be seen directly from the diagram shown in FIG. 3, the following now applies $$\alpha = m \cdot \frac{360°}{n} + \Delta\delta, \qquad \text{EQN 4}$$

with m designating the number of zones Zi within a commutation area 11. In general m is an odd number. In accordance with FIG. 3, m=5.

FIG. 4 shows an alternatively embodied control pattern 12' which is designed for activation of a five-phase, unipolar activated version of the electric motor 1. The control program 12 in accordance with FIG. 4 thus comprises status functions for five phases Pi (i=1,2, . . . ,5) which, in accordance with the unipolar activation vary between the discrete values 0 and 1. Furthermore the full cycle 10 is subdivided here into twenty zones Zi (i=1,2,3, . . . ,20). The control pattern 12' otherwise corresponds to the control pattern 12 described in FIG. 3.

The function of the control element 7 is shown in more detail in FIG. 5. It can be seen from this diagram that the rotary frequency f picked up by the sensor 8 and the associated required variable f0 are fed to a difference module 15. This outputs a difference frequency $\Delta\delta$ to a PI (Proportional/Integral) controller 16. The PI controller 16 creates the adjustable variable S, which—like the accelerator pedal in an automobile—is a measure of the instantaneous power of the electric motor 1.

Figure 6:
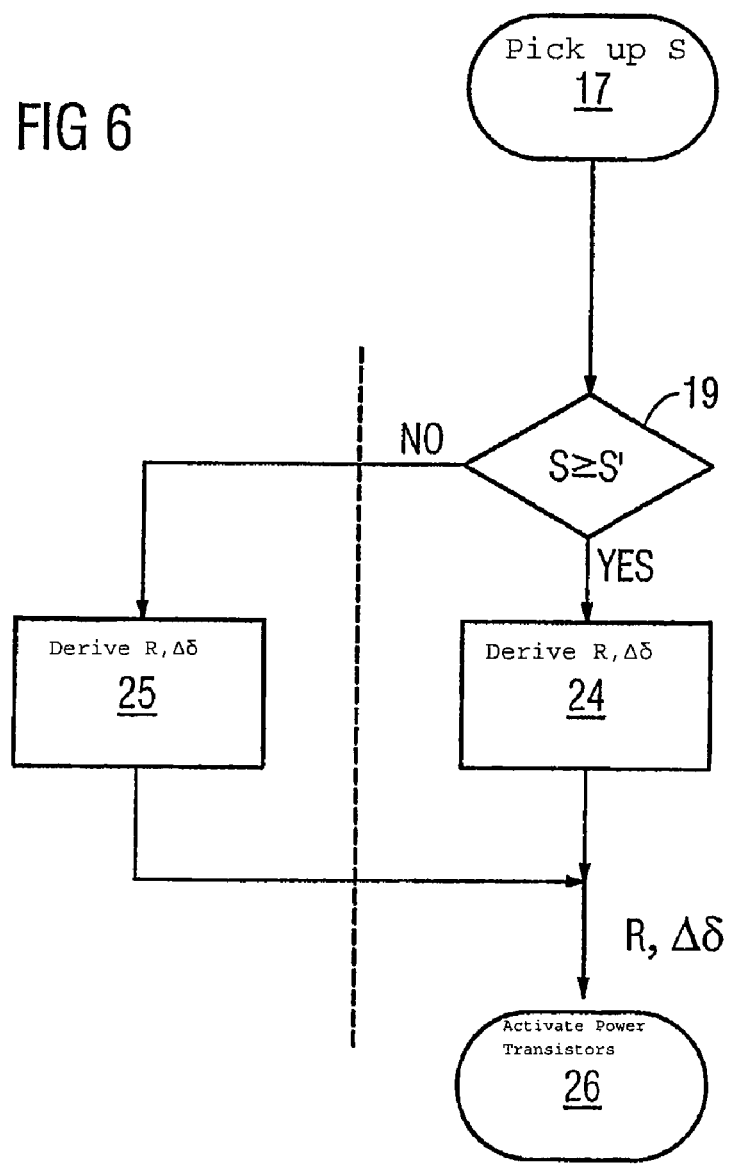

FIG. 6 shows the method performed by the control element 7, the control unit 6 and the converter 5 for commutating the electric motor 1 in a schematic simplified flowchart. Thereafter the adjustable variable S is picked up by a module 17 and fed to a selection module 19.

The selection module 19 checks whether the adjustable variable S corresponds to at least one predetermined threshold value S which delimits a high performance area 21 (FIG. 7) of the electric motor 1 from a low performance area 22. If the condition $S \geq S'$ is fulfilled the module 24 is activated. On the other hand, i.e. if the electric motor 1 is in the low performance area 23, it activates a module 25.

In each of the modules 24 and 25 rules for deriving a number of parameters are stored depending on the adjustable variable S. These parameters included the so-called pulse width ratio R, the difference angle Δδ.

The pulse width ratio R is needed within the context of a pulse width modulation of a phase Pi during the commutation area 11. In this case the phase Pi is activated in a pulse-like manner during the commutation area 11. The pulse width ratio R specifies in this case what proportion of the overall commutation area 11 is taken in by the sum of the pulses. Thus for a pulse width ratio of R=50% the phase Pi during the commutation area 11 is in total only 50% energized whereas the remaining 50% of the commutation area 11 is taken in by pauses between the pulses. With a pulse width ratio R=100% on the offhand the pulses begin immediately after one another so that the phase Pi is constantly activated for the entire commutation area 11. The frequency of the PWM signal is significantly higher than the commutation frequency.

Figure 7:
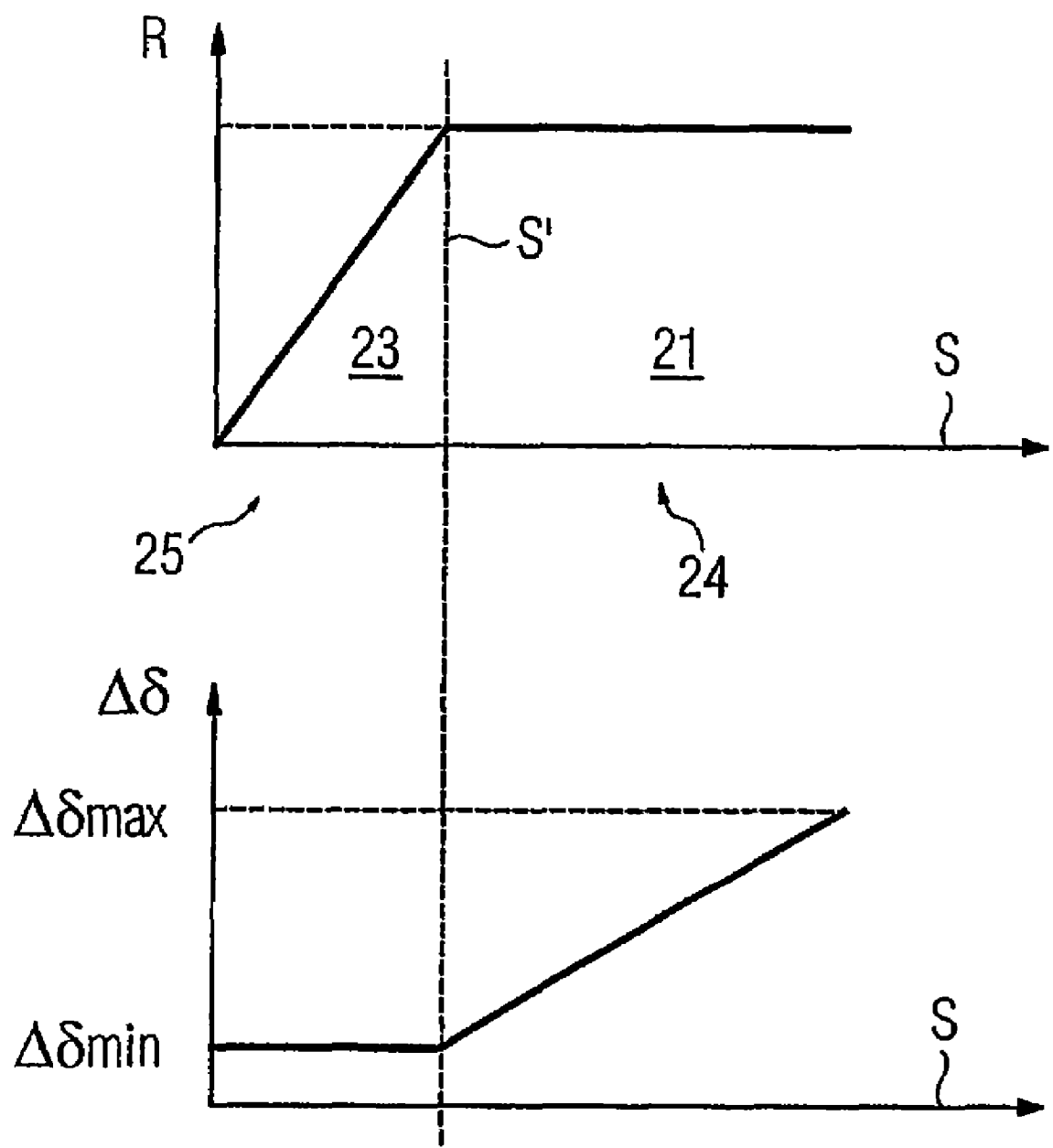

As can be seen from FIG. 7 the commutation of the electric motor 1 in the high performance area 21 is controlled by variation of the difference angle Δδ, and thus according to EQN 4 by variation of the commutation angle α. In the low performance area 23 on the other hand pulse width modulation is used to control the commutation.

In the high performance area 21 the parameters R and Δδ are determined in accordance with the equations stored in a module 24

$$R = 100\% \text{ and} \qquad \text{EQN 5a}$$

$$\Delta\delta = \Delta\delta min + c \cdot (S - S') \qquad \text{EQN 5b}$$

Where Δδmin is a predetermined minimum value of the difference angle Δδ and c is a predetermined constant which is selected so that Δδ≦Δδmax. In accordance with EQN 4, if there is a change in the difference angle Δδ, the commutation angle α is varied between a minimum value set in the low performance area 23 and a maximum value set in the high-performance area 20.

In the low performance area 23 the parameters R and Δδ are set in accordance with the equations stored in module 25

$$R = \frac{S}{S'} \cdot 100\% \qquad \text{EQN 6a}$$

and $$\Delta\delta = \Delta\delta min. \qquad \text{EQN 6b}$$

If for example for the three-phase electric motor 1 in accordance with FIG. 2 and FIG. 3 the commutation angle α is to be between 120° and 150°, depending on the adjustable variable S, Δδmin=−360°/n and Δδmax=0 are to be selected.

The parameters R and Δδ are fed to an activation module 26 which activates the power transistors of the converter 5 on the basis of the control pattern 12,12'. Each switching process predetermined in the control pattern 12,12' with a corresponding orientation angle γ can be directly converted using the equation $$t = t0 + \frac{\gamma}{360° \cdot f} + \Delta t \qquad \text{EQN 7}$$

into a corresponding switching time. t0 in this case designates the time of the Lost 0 passage of the phase P1. The time t0 is supplied together with the current rotary frequency f by the sensor 8. The ignition angle β can be set by using the predetermined time Δδ.

What is claimed is:

1. A method for commutating at least one phase of an electric motor, in which a commutation angle of the at least one phase or of each phase is continuously varied as a function of a rotary frequency of an electromagnetic energizing field of the electric motor and/or of an adjustable variable for the drive power,
    wherein a full cycle of the energizing field is divided into a number of zones and the at least one phase or each phase is commutated in accordance with a control pattern stored depending on these zones with an angular extent of at least two zones being varied for setting the commutation angle.

2. A method in accordance with claim 1, wherein the full cycle is divided into alternating consecutive zones of a first group and zones of a second group, with zones of the same group each featuring the same angular extent.

3. A method in accordance with claim 2, wherein the at least one phase or each phase is activated via an odd number of consecutive zones.

4. A method in accordance with claim 1, wherein the commutation angle is varied between a minimum value corresponding to a low speed and/or power and maximum value corresponding to a high speed and/or power.

5. A method in accordance with claim 1, wherein the characteristic variable for the power ( ) included for adjusting the commutation angle is derived on the basis of the rotary frequency and an associated required value.

6. A method in accordance with claim 1, wherein, the phase at least one or each phase is activated pulse-width modulated depending on the rotary frequency of the energizing field and/or the adjustable variable.

7. A method in accordance with claim 6, wherein, in a low-performance range identified by a low value of the rotary frequency or adjustable variable with a constant commutation angle the phase or each phase is activated pulse-width modulated and in a mid performance range identified by a high value of the rotary frequency or adjustable variable the commutation angle is varied.

8. A method in accordance with claim 1, wherein the phase or each phase is activated in a unipolar manner.

9. A method in accordance with claim 1, wherein the phase or each phase is activated in a bipolar manner.

10. A device for commutating at least one phase of an electric motor, with a converter and a control unit for the converter, the control unit being operable to execute the method in accordance with claim 1.

11. A device in accordance with claim 10, further comprising a sensor which determines the orientation and/or the rotary frequency of the energizing field feeds it to the control unit as an input variable.

* * * * *